(12) United States Patent
Chiang et al.

(10) Patent No.: US 11,746,285 B2
(45) Date of Patent: Sep. 5, 2023

(54) INTRINSIC FLUORESCENT GREEN FIBER AND MANUFACTURING METHOD THEREOF

(71) Applicant: TAIWAN TEXTILE RESEARCH INSTITUTE, New Taipei (TW)

(72) Inventors: Rih-Sheng Chiang, New Taipei (TW); Wei-Jen Lai, New Taipei (TW); Yi-Ching Sung, New Taipei (TW); Sheng-Shan Chang, New Taipei (TW); Chao-Huei Liu, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 298 days.

(21) Appl. No.: 17/070,998

(22) Filed: Oct. 15, 2020

(65) Prior Publication Data

US 2021/0189232 A1    Jun. 24, 2021

(30) Foreign Application Priority Data

Dec. 18, 2019  (TW) ................. 108146506

(51) Int. Cl.
  *C09K 11/02* (2006.01)
  *C08J 3/22* (2006.01)
  (Continued)

(52) U.S. Cl.
  CPC .............. *C09K 11/02* (2013.01); *C08J 3/226* (2013.01); *C09B 67/0033* (2013.01);
  (Continued)

(58) Field of Classification Search
  CPC . C09K 11/02; C09K 11/06; C09K 2211/1018; C08J 3/226; C09B 67/0033;
  (Continued)

(56) References Cited

U.S. PATENT DOCUMENTS

2013/0149933 A1    6/2013  Varga et al.
2014/0302301 A1    10/2014 Pfeffer et al.
(Continued)

FOREIGN PATENT DOCUMENTS

CN    102465350 A    5/2012
CN    109563655 A    4/2019
(Continued)

OTHER PUBLICATIONS

Translation for TW 202024409, Jul. 1, 2020.*

*Primary Examiner* — C Melissa Koslow
(74) *Attorney, Agent, or Firm* — McClure, Qualey & Rodack, LLP (57) ABSTRACT

An intrinsic fluorescent green fiber includes 98.00 to 99.00 parts by weight of a carrier, 0.10 to 0.20 parts by weight of a yellow colorant, 0.08 to 0.20 parts by weight of a blue colorant, and 1.00 to 1.50 parts by weight of a titanium dioxide. When a content of 0.10 wt % to 0.20 wt % of the yellow colorant and a balance of the carrier are mixed to form a yellow fiber, the L*, a*, and b* values of the yellow fiber are respectively between 101.27 and 101.72, between −17.61 and −13.47, and between 89.84 and 108.79. When a content of 0.08 wt % to 0.20 wt % of the blue colorant and a balance of the carrier are mixed to form a blue fiber, the L*, a*, and b* values of the blue fiber are respectively between 55.60 and 66.80, between −22.69 and −22.70, and between −37.50 and −31.80.

9 Claims, 3 Drawing Sheets

(51) Int. Cl.
- *C09B 67/22* (2006.01)
- *C09B 67/20* (2006.01)
- *C09K 11/06* (2006.01)
- *D01F 1/04* (2006.01)
- *D01F 1/06* (2006.01)
- *D01F 1/10* (2006.01)
- *D01F 6/62* (2006.01)
- *D01F 6/84* (2006.01)
- *D01D 5/08* (2006.01)

(52) U.S. Cl.
CPC .......... *C09B 67/0063* (2013.01); *C09K 11/06* (2013.01); *D01F 1/04* (2013.01); *D01F 1/06* (2013.01); *D01F 1/10* (2013.01); *D01F 6/62* (2013.01); *D01F 6/84* (2013.01); *C09K 2211/1018* (2013.01); *D01D 5/08* (2013.01)

(58) Field of Classification Search
CPC .......... C09B 67/0063; D01F 1/04; D01F 1/06; D01F 1/10; D01F 6/62; D01F 6/84; D01F 5/06

See application file for complete search history.

(56) References Cited

U.S. PATENT DOCUMENTS

| | | |
|---|---|---|
| 2016/0138217 A1 | 5/2016 | Emlinger et al. |
| 2019/0161893 A1 | 5/2019 | Tsunofuri et al. |
| 2020/0017643 A1 | 1/2020 | Su |

FOREIGN PATENT DOCUMENTS

| | | | |
|---|---|---|---|
| CN | 110273194 A | | 9/2019 |
| EP | 3587475 A1 | | 1/2020 |
| JP | H02200862 A | | 8/1990 |
| JP | 2018159159 A | | 10/2018 |
| KR | 10-1370501 B1 | | 3/2014 |
| TW | 201938863 A | | 10/2019 |
| TW | I693310 B | | 5/2020 |
| TW | 202024409 | * | 7/2020 |
| TW | 202024409 A | | 7/2020 |
| WO | 2005061777 A1 | | 7/2005 |
| WO | 2006017709 A2 | | 2/2006 |
| WO | 2011032191 A1 | | 3/2011 |
| WO | 2012012813 A1 | | 2/2012 |
| WO | 2018154409 A1 | | 8/2018 |

* cited by examiner

INTRINSIC FLUORESCENT GREEN FIBER AND MANUFACTURING METHOD THEREOF

RELATED APPLICATION

This application claims priority to Taiwan Application Serial Number 108146506, filed Dec. 18, 2019, which is herein incorporated by reference.

BACKGROUND

Field of Invention

The present disclosure relates to an intrinsic fluorescent green fiber and a method of manufacturing the same.

Description of Related Art

Under a trend of globalization, textile industry faces strong competitive pressure. The textile industry must continuously develop new technologies and diversified products in order to face global competitions. In the modern society, more and more people are active at night, such as night workers (e.g., police or cleaners), cyclists, road runners, and so on. In order to improve the safety of night activities, the development of clothing made from fluorescent fibers has received great attention from the textile industry.

SUMMARY

The present disclosure provides an intrinsic fluorescent green fiber and a method of manufacturing the same.

According to some embodiments of the present disclosure, the intrinsic fluorescent green fiber includes 98.00 parts by weight to 99.00 parts by weight of a carrier, 0.10 parts by weight to 0.20 parts by weight of a yellow colorant, 0.08 parts by weight to 0.20 parts by weight of a blue colorant, and 1.00 part by weight to 1.50 parts by weight of a titanium dioxide. The carrier includes polyethylene terephthalate (PET). When a content of 0.10 wt % to 0.20 wt % of the yellow colorant and a balance of the carrier are mixed together to form a yellow fiber, a L* value, an a* value, and a b* value of the yellow fiber in a L*a*b* color space are respectively between 101.27 and 101.72, between −17.61 and −13.47, and between 89.84 and 108.79. When a content of 0.08 wt % to 0.20 wt % of the blue colorant and a balance of the carrier are mixed together to form a blue fiber, a L* value, an a* value, and a b* value of the blue fiber in the L*a*b* color space are respectively between 55.60 and 66.80, between −22.69 and −22.70, and between −37.50 and −31.80.

In some embodiments of the present disclosure, the yellow colorant is a fluorescent yellow dye, and the blue colorant is a fluorescent blue pigment.

In some embodiments of the present disclosure, a crystal structure of the titanium dioxide is rutile.

In some embodiments of the present disclosure, a color of the intrinsic fluorescent green fiber meets the specification of standard EN1150.

In some embodiments of the present disclosure, the yellow colorant includes a structure represented by at least one of the formula (1), formula (2), formula (3), and formula (4):

formula (1)

formula (2)

formula (3)

formula (4)

According to some other embodiments of the present disclosure, a method of manufacturing an intrinsic fluorescent green fiber includes the following steps. Mixing 20 parts by weight to 60 parts by weight of a yellow fiber masterbatch, 16 parts by weight to 40 parts by weight of a blue fiber masterbatch, 200 parts by weight to 300 parts by weight of a white fiber masterbatch, and 624 parts by weight to 770 parts by weight of a carrier. Performing a melt-spinning process, such that the intrinsic fluorescent green fiber is formed.

In some embodiments of the present disclosure, a manufacturing method of the yellow fiber masterbatch includes the following steps. Uniformly mixing 10 parts by weight to 20 parts by weight of a yellow colorant, 10 parts by weight to 20 parts by weight of a dispersant, and 60 parts by weight to 80 parts by weight of water, such that a mixture is formed, in which when a content of 0.10 wt % to 0.20 wt % of the yellow colorant and a balance of the carrier are mixed together to form a yellow fiber, a L* value, an a* value, and a b* value of the yellow fiber in a L*a*b* color space are respectively between 101.27 and 101.72, between −17.61 and −13.47, and between 89.84 and 108.79. Performing a wet grinding and dispersing process to the mixture, such that a yellow color paste modified dispersant with an average particle diameter of 100 nm to 200 nm is formed. Uniformly mixing 79 parts by weight to 89 parts by weight of a substrate powder, 10 parts by weight to 20 parts by weight of the yellow color paste modified dispersant, and 0.1 parts by weight to 1.0 part by weight of an additive, in which the substrate powder includes polybutylene terephthalate (PBT). Performing a drying process, such that the water is removed. Performing a kneading granulation process, such that the yellow fiber masterbatch is formed, in which a kneading temperature of the kneading granulation process is between 220° C. and 250° C.

In some embodiments of the present disclosure, a manufacturing method of the blue fiber masterbatch includes the following steps. Uniformly mixing 10 parts by weight to 20 parts by weight of a blue colorant, 10 parts by weight to 20 parts by weight of a dispersant, and 60 parts by weight to 80 parts by weight of water, such that a mixture is formed, in which when a content of 0.08 wt % to 0.20 wt % of the blue colorant and a balance of the carrier are mixed together to form a blue fiber, a L* value, an a* value, and a b* value of the blue fiber in the L*a*b* color space are respectively between 55.60 and 66.80, between −22.69 and −22.70, and between −37.50 and −31.80. Performing a wet grinding and dispersing process to the mixture, such that a blue color paste modified dispersant with an average particle diameter of 100 nm to 200 nm is formed. Uniformly mixing 79 parts by weight to 89 parts by weight of a substrate powder, 10 parts by weight to 20 parts by weight of the blue color paste modified dispersant, and 0.1 parts by weight to 1.0 part by weight of an additive, in which the substrate powder includes polybutylene terephthalate. Performing a drying process, such that the water is removed. Performing a kneading granulation process, such that the blue fiber masterbatch is formed, in which a kneading temperature of the kneading granulation process is between 220° C. and 250° C.

In some embodiments of the present disclosure, a manufacturing method of the white fiber masterbatch includes the following steps. Uniformly mixing 10 parts by weight to 20 parts by weight of a titanium dioxide, 10 parts by weight to 20 parts by weight of a dispersant, and 60 parts by weight to 80 parts by weight of water, such that a mixture is formed. Performing a wet grinding and dispersing process to the mixture, such that a white color paste modified dispersant with an average particle diameter of 100 nm to 200 nm is formed. Uniformly mixing 79 parts by weight to 89 parts by weight of a substrate powder, 10 parts by weight to 20 parts by weight of the white color paste modified dispersant, and 0.1 parts by weight to 1.0 part by weight of an additive, in which the substrate powder includes polybutylene terephthalate. Performing a drying process, such that the water is removed. Performing a kneading granulation process, such that the white fiber masterbatch is formed, in which a kneading temperature of the kneading granulation process is between 220° C. and 250° C.

In some embodiments of the present disclosure, a spinning temperature of the melt-spinning process is between 275° C. and 285° C.

According to the aforementioned embodiments of the present disclosure, the color and the visual whiteness (β) of the intrinsic fluorescent green fibers of the present disclosure are close to or meet the specification of standard EN1150. In addition, the intrinsic fluorescent green fibers of the present disclosure have good sunlight fastness, washing fastness, sweat fastness, heat press fastness, and dry heat fastness, and hence can meet users' needs.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the present disclosure, various color paste modified dispersants of different colors are prepared through a wet grinding and dispersing process, thereby forming fiber masterbatches of various colors. By mixing the fiber masterbatches of various colors with a carrier in a specific ratio, an intrinsic fluorescent green fiber is further formed. The intrinsic fluorescent green fiber of the present disclosure is close to or meets the specification of standard EN1150.

Figure 1:
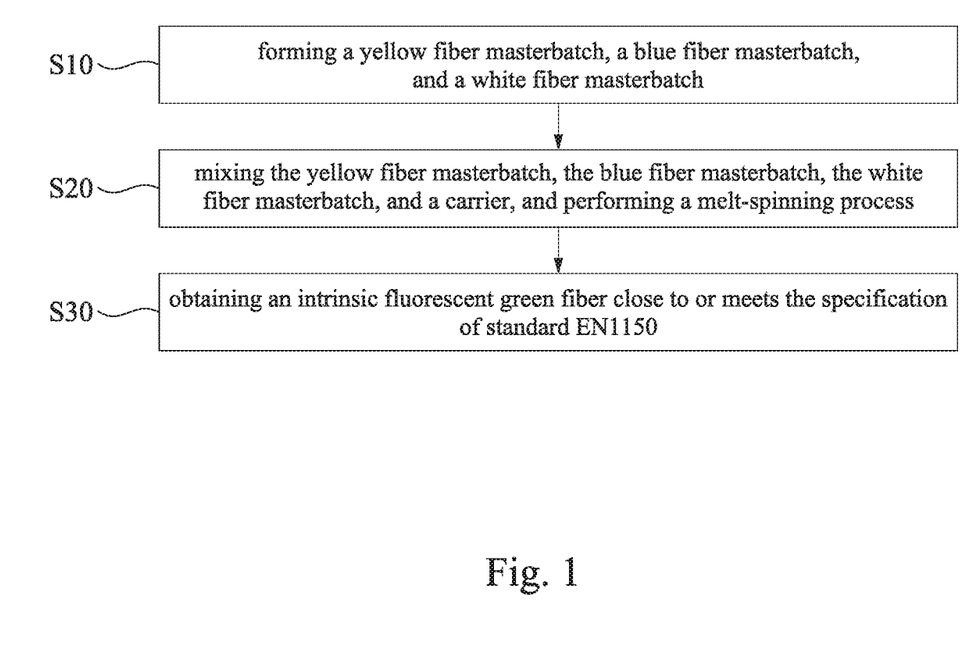
FIG. 1 is a flow chart illustrating a method of manufacturing an intrinsic fluorescent green fiber according to some embodiments of the present disclosure.

FIG. 1 is a flow chart illustrating a method of manufacturing an intrinsic fluorescent green fiber according to some embodiments of the present disclosure. The method of manufacturing the intrinsic fluorescent green fiber includes step S10, S20, and S30. In step S10, a yellow fiber masterbatch, a blue fiber masterbatch, and a white fiber masterbatch are formed. In step S20, the yellow fiber masterbatch, the blue fiber masterbatch, the white fiber masterbatch, and a carrier are mixed, and a melt-spinning process is preformed, such that the intrinsic fluorescent green fiber which is close to or meets the specification of standard EN1150 can be obtained in step S30.

In step S10, a wet grinding and dispersing process and a kneading granulation technology are adopted to form the yellow fiber masterbatch, the blue fiber masterbatch, and the white fiber masterbatch. It is noted that a method of manufacturing the yellow fiber masterbatch is similar to a method of manufacturing the blue fiber masterbatch and a method of manufacturing the white fiber masterbatch. For clarity and convenience of descriptions, the methods of manufacturing the yellow fiber masterbatch, the blue fiber masterbatch, and the white fiber masterbatch will be discussed together below.

Firstly, 10 parts by weight to 20 parts by weight of a colorant, 10 parts by weight to 20 parts by weight of a dispersant, and 60 parts by weight to 80 parts by weight of water are uniformly mixed, such that a mixture is formed. When a yellow fiber masterbatch is to be manufactured, the colorant used is a yellow colorant. In some embodiments, the yellow colorant is a fluorescent yellow dye. In some other embodiments, the yellow colorant is the fluorescent yellow dye and includes a structure represented by at least one of the formula (1), formula (2), formula (3), and formula (4).

In addition, when a blue fiber masterbatch is to be manufactured, the colorant used is a blue colorant. In some embodiments, the blue colorant is a fluorescent blue pigment. Furthermore, when a white fiber masterbatch is to be manufactured, the colorant used is a titanium dioxide (TiO$_2$). In some embodiments, a crystal structure of the titanium dioxide is rutile. Furthermore, in the process of forming the mixture, 0.01 parts by weight to 0.1 parts by weight of a defoamer can be added to the mixture as deemed necessary, such that the foam in the mixture is removed. In some embodiments, the dispersant is, for example, the commer- cially available BYK190® (product name, purchased from Ecotec Naturfarben Co., Ltd.), and the defoamer is, for example, the commercially available BASF-FOAMAS-TER®333 (product name, purchased from Badische Anilin-und-Soda-Fabrik (BASF) Co., Ltd.)

Then, a wet grinding and dispersing process is performed to the mixture, such that a color paste modified dispersant with an average particle diameter of 100 nm to 200 nm is formed. In detail, when the colorant in the mixture is the yellow colorant, the color paste modified dispersant obtained is a yellow color paste modified dispersant, when the colorant in the mixture is the blue colorant, the color paste modified dispersant obtained is a blue color paste modified dispersant, and when the colorant in the mixture is the titanium dioxide, the color paste modified dispersant obtained is a white color paste modified dispersant. In some embodiments, the wet grinding and dispersing process include grinding the mixture for 30 minutes to 120 minutes at a speed of 1500 rpm to 2700 rpm.

After that, 79 parts by weight to 89 parts by weight of a substrate powder, 10 parts by weight to 20 parts by weight of the color paste modified dispersant, and 0.1 parts by weight to 1.0 part by weight of an additive are uniformly mixed. In detail, when a yellow fiber masterbatch is to be manufactured, the color paste modified dispersant used is a yellow color paste modified dispersant, when a blue fiber masterbatch is to be manufactured, the color paste modified dispersant used is a blue color paste modified dispersant, and when a white fiber masterbatch is to be manufactured, the color paste modified dispersant used is a white color paste modified dispersant. In some embodiments, the substrate powder includes polybutylene terephthalate (PBT). In addition, the additive can be a dispersant, an antioxidant, a stabilizer, or combinations thereof.

Then, a drying process is performed such that the water is removed, and a kneading granulation process is performed such that the yellow fiber masterbatch, the blue fiber masterbatch, and the white fiber masterbatch are formed. In some embodiments, a drying temperature of the drying process is between 90° C. and 110° C., and a drying time of the drying process is between 12 hours and 24 hours. In some embodiments, a kneading temperature of the kneading granulation process is between 220° C. and 250° C.

In step S20, 20 parts by weight to 60 parts by weight of a yellow fiber masterbatch, 16 parts by weight to 40 parts by weight of a blue fiber masterbatch, 200 parts by weight to 300 parts by weight of a white fiber masterbatch, and 624 parts by weight to 770 parts by weight of a carrier are uniformly mixed, and the melt-spinning process is performed, such that the intrinsic fluorescent green fiber which is close to or meets the specification of standard EN1150 can be obtained. In some embodiments, a spinning temperature of the melt-spinning process is between 275° C. and 285° C. In addition, the intrinsic fluorescent green fiber manufactured by the above components and ratio thereof includes 98.00 parts by weight to 99.00 parts by weight of the carrier, 0.10 parts by weight to 0.20 parts by weight of the yellow colorant, 0.08 parts by weight to 0.20 parts by weight of the blue colorant, and 1.00 part by weight to 1.50 parts by weight of the titanium dioxide. In some embodiments, a fiber specification of the intrinsic fluorescent green fiber may be, for example, between 45d/48f and 200d/48f. In some embodiments, a CIE1931 color space coordinates can be used to compare the color of the intrinsic fluorescent green fiber and measure the whiteness (β) of the intrinsic fluorescent green fiber, in order to confirm whether the intrinsic fluorescent green fiber is close to or meets the specification of standard EN1150.

It should be noted that, when the yellow fiber masterbatch of the present disclosure is mixed with the carrier such that a yellow fiber formed includes a content of 0.10 wt % to 0.20 wt % of the yellow colorant, a L* value, an a* value, and a b* value of the yellow fiber in a L*a*b* color space are respectively between 101.27 and 101.72, between −17.61 and −13.47, and between 89.84 and 108.79. When the blue fiber masterbatch of the present disclosure is mixed with the carrier such that a blue fiber formed includes a content of 0.08 wt % to 0.20 wt % of the blue colorant, a L* value, an a* value, and a b* value of the blue fiber in the L*a*b* color space are respectively between 55.60 and 66.80, between −22.69 and −22.70, and between −37.50 and −31.80.

In the following descriptions, the intrinsic fluorescent green fibers of embodiments 1 to 7 are listed to be further discussed. The intrinsic fluorescent green fiber of each embodiment is manufactured by performing steps S10 to S30, and the content of each colorant in the intrinsic fluorescent green fiber of each embodiment is shown in Table 1, in which the total weight of the intrinsic fluorescent green fiber is substantially 100 parts by weight.

TABLE 1

| | yellow colorant (part by weight) | blue colorant (part by weight) | titanium dioxide (part by weight) |
|---|---|---|---|
| embodiment 1 | 0.10 | 0.20 | 1.00 |
| embodiment 2 | 0.10 | 0.10 | 1.00 |
| embodiment 3 | 0.10 | 0.05 | 1.00 |
| embodiment 4 | 0.20 | 0.08 | 1.00 |
| embodiment 5 | 0.20 | 0.08 | 1.50 |
| embodiment 6 | 0.30 | 0.08 | 1.50 |
| embodiment 7 | 0.10 | 0.08 | 1.50 |

Figure 2:
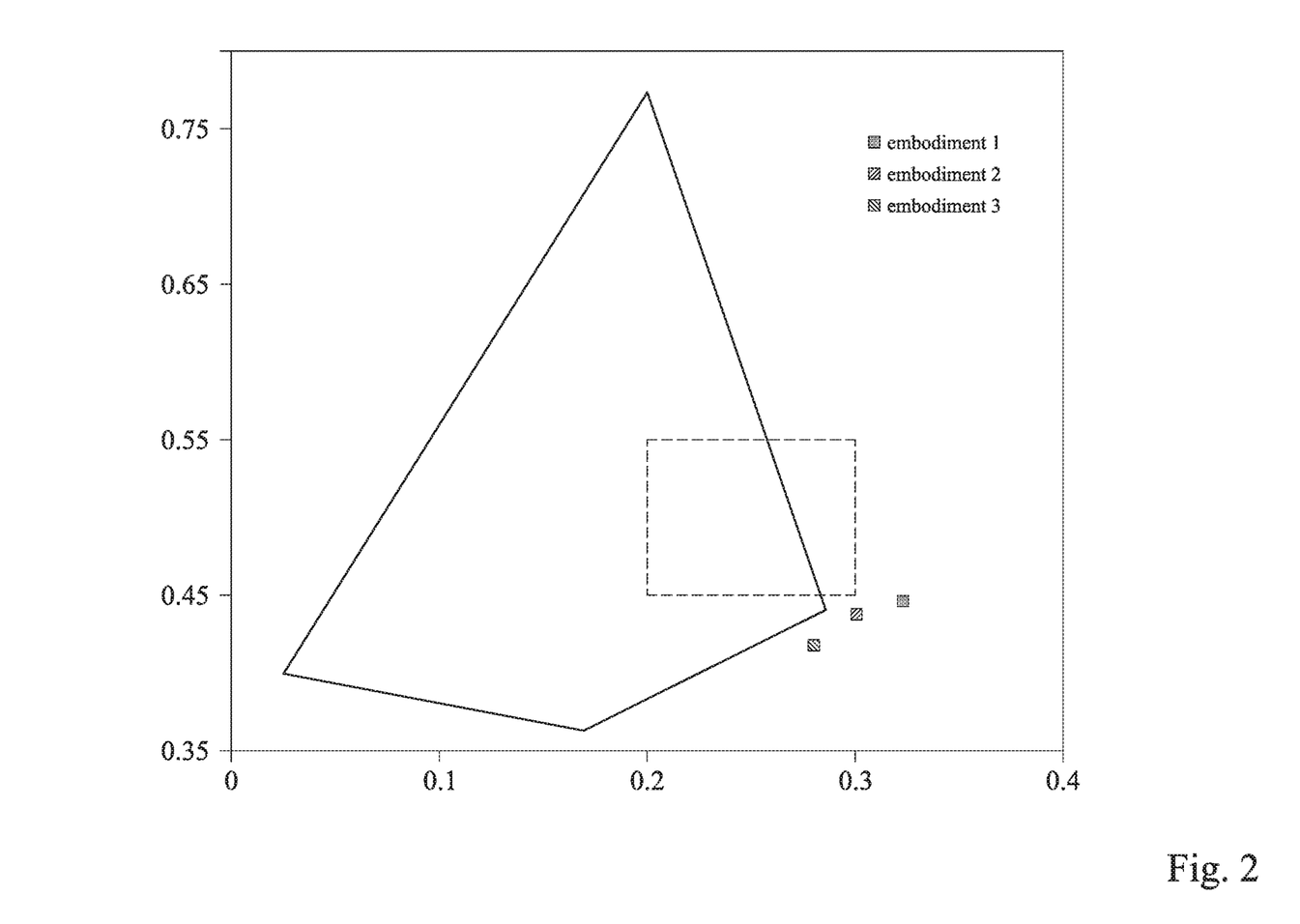
FIG. 2 illustrates the position distributions of the color of the intrinsic fluorescent green fiber of embodiments 1 to 3 in the CIE1931 color space, in which the irregular quadrilateral region is the fluorescent green color region of standard EN1150.
Figure 3:
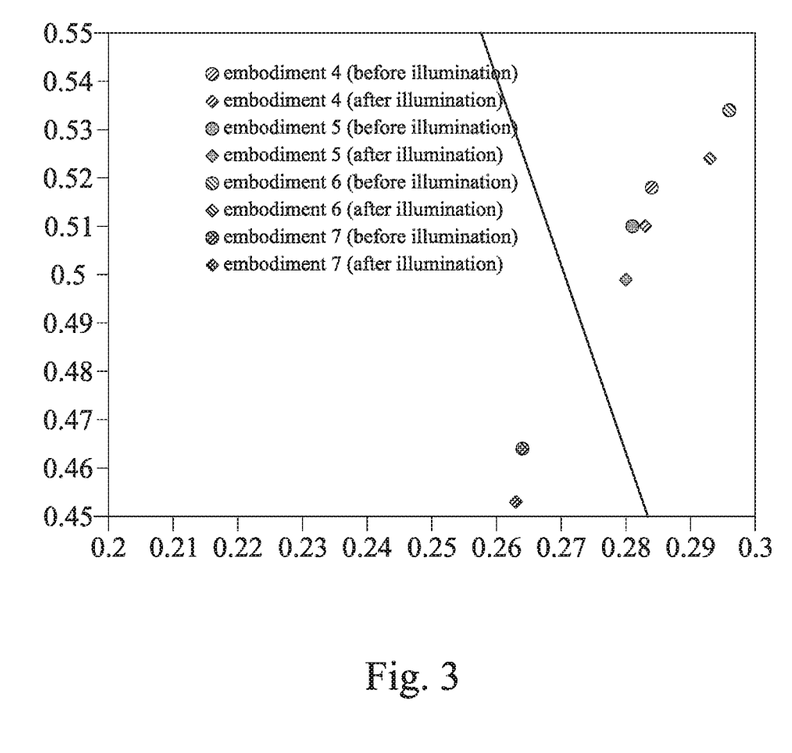
FIG. 3 illustrates the position distributions of the color of the intrinsic fluorescent green fiber of embodiments 4 to 7 in the CIE1931 color space, which is presented through a partially enlarged diagram of the dashed region shown in FIG. 2.

FIG. 2 illustrates the position distributions of the color of the intrinsic fluorescent green fibers of embodiments 1 to 3 in the CIE1931 color space, in which the irregular quadrilateral region is the fluorescent green color region of standard EN1150. FIG. 3 illustrates the position distributions of the color of the intrinsic fluorescent green fibers of embodiments 4 to 7 in the CIE1931 color space, which is presented through a partially enlarged diagram of the dashed region shown in FIG. 2. The results of the color region detection are shown in Table 2, and the color region detection is performed by method EN1150:1999.

TABLE 2

| | X | Y | β |
|---|---|---|---|
| embodiment 1 | 0.321 | 0.447 | 0.42 |
| embodiment 2 | 0.300 | 0.439 | 0.43 |
| embodiment 3 | 0.278 | 0.419 | 0.45 |
| embodiment 4 (before illumination) | 0.284 | 0.518 | 0.43 |
| embodiment 4 (after illumination) | 0.283 | 0.510 | 0.44 |
| embodiment 5 (before illumination) | 0.281 | 0.510 | 0.43 |
| embodiment 5 (after illumination) | 0.280 | 0.499 | 0.44 |
| embodiment 6 (before illumination) | 0.296 | 0.534 | 0.45 |
| embodiment 6 (after illumination) | 0.293 | 0.524 | 0.45 |
| embodiment 7 (before illumination) | 0.264 | 0.464 | 0.42 |
| embodiment 7 (after illumination) | 0.263 | 0.453 | 0.43 |

As shown in FIG. 2, the position distribution of the color of the intrinsic fluorescent green fibers of embodiments 1 to 3 in the CIE1931 color space coordinates is close to the fluorescent green region specified by standard EN1150. As shown in FIG. 3, the position distribution of the color of the intrinsic fluorescent green fibers of embodiments 4 to 6 in the CIE1931 color space coordinates is close to the fluorescent green region specified by standard EN1150 before and after illumination, and the color of the intrinsic fluorescent green fiber of embodiment 7 in the CIE1931 color space coordinates falls within the fluorescent green region specified by standard EN1150 before and after illumination. In addition, referring to each of the intrinsic fluorescent green fibers of embodiments 4 to 7 before and after illumination, it can be found that the position distribution of the color of each of the intrinsic fluorescent green fibers of embodiments 4 to 7 in the CIE1931 color space coordinate changes little before and after illumination. Accordingly, the intrinsic fluorescent green fibers of the present disclosure can still maintain good color stability before and after illumination.

It should be understood that since the intrinsic fluorescent green fiber of the present disclosure is manufactured by mixing the fiber masterbatches of various colors, the fluorescent green fiber of the present disclosure can have a fluorescent green color without any dyeing process, and hence is given the name "intrinsic" fluorescent green fiber. Therefore, the intrinsic fluorescent green fiber of the present disclosure may have good dyeing uniformity, washing fastness, sweat fastness, sunlight fastness, heat press fastness, and dry heat fastness. In the following descriptions, the intrinsic fluorescent green fibers of embodiments 4 to 7 will be tested on their washing fastness, sweat fastness, and sunlight fastness, and the intrinsic fluorescent green fiber of embodiment 7 will be tested on its heat press fastness and dry heat fastness to further verify the efficacy of the present disclosure.

Experiment 1: The Washing Fastness Test and the Sweat Fastness Test

The intrinsic fluorescent green fibers of embodiments 4 to 7 are tested under the washing fastness test and the sweat fastness test, in which the washing fastness test is performed under method AATCC 61-2013-1A, and the sweat fastness test is performed under method AATCC 15-2013. The test results are shown in Table 3.

TABLE 3

| | color faded/change | contamination | | | | | acetic acid |
|---|---|---|---|---|---|---|---|
| | | wool | acrylic | tetoron | nylon | cotton | |
| | Results for washing fastness test (grade) | | | | | | |
| embodiment 4 | 4.5 | 4.5 | 4.5 | 4.5 | 4.5 | 4.5 | 4.5 |
| embodiment 5 | 4.5 | 4.5 | 4.5 | 4.5 | 4.5 | 4.5 | 4.5 |

TABLE 3-continued

| | color faded/ change | contamination | | | | | |
|---|---|---|---|---|---|---|---|
| | | wool | acrylic | tetoron | nylon | cotton | acetic acid |
| embodiment 6 | 4.5 | 4.5 | 4.5 | 4.5 | 4.5 | 4.5 | 4.5 |
| embodiment 7 | 4.5 | 4.5 | 4.5 | 4.5 | 4.5 | 4.5 | 4.5 |
| Results for sweat fastness test (grade) | | | | | | | |
| embodiment 4 | 4.5 | 4.5 | 4.5 | 4.5 | 4.5 | 4.5 | 4.5 |
| embodiment 5 | 4.5 | 4.5 | 4.5 | 4.5 | 4.5 | 4.5 | 4.5 |
| embodiment 6 | 4.5 | 4.5 | 4.5 | 4.5 | 4.5 | 4.5 | 4.5 |
| embodiment 7 | 4.5 | 4.5 | 4.5 | 4.5 | 4.5 | 4.5 | 4.5 |

As shown in Table 3, the intrinsic fluorescent green fibers of embodiments 4 to 7 have almost no color transfer to wool, acrylic, tetoron, nylon, cotton, and acetic acid. Accordingly, the intrinsic fluorescent green fibers of embodiments 4 to 7 can have considerable washing fastness and sweat fastness, which meets users' needs.

Experiment 2: The Sunlight Fastness Test

The intrinsic fluorescent green fibers of embodiments 4 to 7 are tested under the sunlight fastness test, in which the sunlight fastness test is performed under method 16.2-2014 Option 1 and method AATCC 16.3 Option 1. The test results are shown in Table 4.

TABLE 4

| | Results for sunlight fastness test (grade) |
|---|---|
| embodiment 4 | over 4 |
| embodiment 5 | over 4 |
| embodiment 6 | over 4 |
| embodiment 7 | 4 |

As shown in Table 4, the intrinsic fluorescent green fibers of embodiments 4 to 7 can almost maintain their original colors after the sunlight fastness test. Accordingly, the intrinsic fluorescent green fibers of embodiments 4 to 7 can have a considerable sunlight fastness, which meets users' needs.

Experiment 3: The Heat Press Fastness Test and the Dry Heat Fastness Test

The intrinsic fluorescent green fiber of embodiment 7 are tested under the heat press fastness test and the dry heat fastness test, in which the heat press fastness is performed under method CNS 8532 L3156-1999, and the dry heat fastness is performed under method CNS 9021 L3178-1998. The test results are shown in Table 5.

TABLE 5

| | | test items | | test results (grade) |
|---|---|---|---|---|
| heat press fastness | 150 ± 2° C. dry | color faded/change | | 4-5 |
| | | contamination | cotton | 4-5 |
| | semi-wet | color faded/change | | 4-5 |
| | | contamination | cotton | 4-5 |
| | wet | color faded/change | | 4-5 |
| | | contamination | cotton | 4-5 |
| | 200 ± 2° C. dry | color faded/change | | 4-5 |
| | | contamination | cotton | 4-5 |
| | semi-wet | color faded/change | | 4-5 |
| | | contamination | cotton | 4-5 |
| | wet | color faded/change | | 4-5 |
| | | contamination | cotton | 4-5 |

| | | test items | | test results (grade) |
|---|---|---|---|---|
| dry heat fastness | 180 ± 2° C. | color faded/change | | 4-5 |
| | | contamination | tetoron | 4-5 |
| | | | cotton | 4-5 |
| | 210 ± 2° C. | color faded/change | | 4-5 |
| | | contamination | tetoron | 4 |
| | | | cotton | 4-5 |

As shown in Table 5, the intrinsic fluorescent green fibers of embodiment 7 can almost maintain its original color in a hot pressing (ironing) environment and a dry heat environment. Accordingly, the intrinsic fluorescent green fiber of embodiment 7 can have considerable heat press fastness and the dry heat fastness, which meets users' needs.

According to the aforementioned embodiments of the present disclosure, the color and the visual whiteness (β) of the intrinsic fluorescent green fibers of the present disclosure are close to or meet the specification of standard EN1150. In addition, the intrinsic fluorescent green fibers of the present disclosure have good sunlight fastness, washing fastness, sweat fastness, heat press fastness, and dry heat fastness, and hence can meet users' needs.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An intrinsic fluorescent green fiber, comprising:
   98.00 parts by weight to 99.00 parts by weight of a carrier, wherein the carrier comprises polyethylene terephthalate;
   0.10 parts by weight to 0.20 parts by weight of a yellow colorant, wherein the yellow colorant is a fluorescent yellow dye, and when a content of 0.10 wt % to 0.20 wt % of the yellow colorant and a balance of the carrier are mixed together to form a yellow fiber, a $L^*$ value, an $a^*$ value, and a $b^*$ value of the yellow fiber in a $L^*a^*b^*$ color space are respectively between 101.27 and 101.72, between −17.61 and −13.47, and between 89.84 and 108.79;
   0.08 parts by weight to 0.20 parts by weight of a blue colorant, wherein the blue colorant is a fluorescent blue pigment, and when a content of 0.08 wt % to 0.20 wt % of the blue colorant and a balance of the carrier are mixed together to form a blue fiber, a $L^*$ value, an $a^*$ value, and a $b^*$ value of the blue fiber in the $L^*a^*b^*$ color space are respectively between 55.60 and 66.80, between −22.69 and −22.70, and between −37.50 and −31.80; and 1.00 part by weight to 1.50 parts by weight of a titanium dioxide.

2. The intrinsic fluorescent green fiber of claim 1, wherein a crystal structure of the titanium dioxide is rutile.

3. The intrinsic fluorescent green fiber of claim 1, wherein a color of the intrinsic fluorescent green fiber meets the specification of standard EN1150.

4. The intrinsic fluorescent green fiber of claim 1, wherein the yellow colorant comprises a structure represented by at least one of the formula (1), formula (2), formula (3), and formula (4):

formula (1)

formula (2)

formula (3)

formula (4)

5. A method of manufacturing an intrinsic fluorescent green fiber, comprising:

mixing 20 parts by weight to 60 parts by weight of a yellow fiber masterbatch, 16 parts by weight to 40 parts by weight of a blue fiber masterbatch, 200 parts by weight to 300 parts by weight of a white fiber masterbatch, and 624 parts by weight to 770 parts by weight of a carrier, wherein the yellow fiber masterbatch comprises a yellow colorant, the yellow colorant is a fluorescent yellow dye, the blue fiber masterbatch comprises a blue colorant, the blue colorant is a fluorescent blue pigment, and the carrier comprises polyethylene terephthalate; and performing a melt-spinning process, such that the intrinsic fluorescent green fiber is formed.

6. The method of manufacturing the intrinsic fluorescent green fiber of claim 5, wherein a method of manufacturing the yellow fiber masterbatch comprises:

uniformly mixing 10 parts by weight to 20 parts by weight of the yellow colorant, 10 parts by weight to 20 parts by weight of a dispersant, and 60 parts by weight to 80 parts by weight of water, such that a mixture is formed, wherein when a content of 0.10 wt % to 0.20 wt % of the yellow colorant and a balance of the carrier are mixed together to form a yellow fiber, a $L^*$ value, an $a^*$ value, and a $b^*$ value of the yellow fiber in a $L^*a^*b^*$ color space are respectively between 101.27 and 101.72, between −17.61 and −13.47, and between 89.84 and 108.79;

performing a wet grinding and dispersing process to the mixture, such that a yellow color paste modified dispersant with an average particle diameter of 100 nm to 200 nm is formed;

uniformly mixing 79 parts by weight to 89 parts by weight of a substrate powder, 10 parts by weight to 20 parts by weight of the yellow color paste modified dispersant, and 0.1 parts by weight to 1.0 part by weight of an additive, wherein the substrate powder comprises polybutylene terephthalate, and the additive is a dispersant, an antioxidant, or a stabilizer;

performing a drying process, such that the water is removed; and performing a kneading granulation process, such that the yellow fiber masterbatch is formed, wherein a kneading temperature of the kneading granulation process is between 220° C. and 250° C.

7. The method of manufacturing the intrinsic fluorescent green fiber of claim 5, wherein a method of manufacturing the blue fiber masterbatch comprises:

uniformly mixing 10 parts by weight to 20 parts by weight of the blue colorant, 10 parts by weight to 20 parts by weight of a dispersant, and 60 parts by weight to 80 parts by weight of water, such that a mixture is formed, wherein when a content of 0.08 wt % to 0.20 wt % of the blue colorant and a balance of the carrier are mixed together to form a blue fiber, a $L^*$ value, an $a^*$ value, and a $b^*$ value of the blue fiber in the $L^*a^*b^*$ color space are respectively between 55.60 and 66.80, between −22.69 and −22.70, and between −37.50 and −31.80;

performing a wet grinding and dispersing process to the mixture, such that a blue color paste modified dispersant with an average particle diameter of 100 nm to 200 nm is formed;

uniformly mixing 79 parts by weight to 89 parts by weight of a substrate powder, 10 parts by weight to 20 parts by weight of the blue color paste modified dispersant, and 0.1 parts by weight to 1.0 part by weight of an additive, wherein the substrate powder comprises polybutylene terephthalate, and the additive is a dispersant, an antioxidant, or a stabilizer;

performing a drying process, such that the water is removed; and performing a kneading granulation process, such that the blue fiber masterbatch is formed, wherein a kneading temperature of the kneading granulation process is between 220° C. and 250° C.

8. The method of manufacturing the intrinsic fluorescent green fiber of claim 5, wherein a method of manufacturing the white fiber masterbatch comprises:

uniformly mixing 10 parts by weight to 20 parts by weight of a titanium dioxide, 10 parts by weight to 20 parts by weight of a dispersant, and 60 parts by weight to 80 parts by weight of water, such that a mixture is formed;

performing a wet grinding and dispersing process to the mixture, such that a white color paste modified dispersant with an average particle diameter of 100 nm to 200 nm is formed;

uniformly mixing 79 parts by weight to 89 parts by weight of a substrate powder, 10 parts by weight to 20 parts by weight of the white color paste modified dispersant, and 0.1 parts by weight to 1.0 part by weight of an additive, wherein the substrate powder comprises polybutylene terephthalate, and the additive is a dispersant, an antioxidant, or a stabilizer;

performing a drying process, such that the water is removed; and performing a kneading granulation process, such that the white fiber masterbatch is formed, wherein a kneading temperature of the kneading granulation process is between 220° C. and 250° C.

9. The method of manufacturing the intrinsic fluorescent green fiber of claim 5, wherein a spinning temperature of the melt-spinning process is between 275° C. and 285° C.

\* \* \* \* \*